June 10, 1941.  A. O. LA DUCER  2,244,883
WIRING DEVICE
Filed Sept. 19, 1939  3 Sheets-Sheet 2
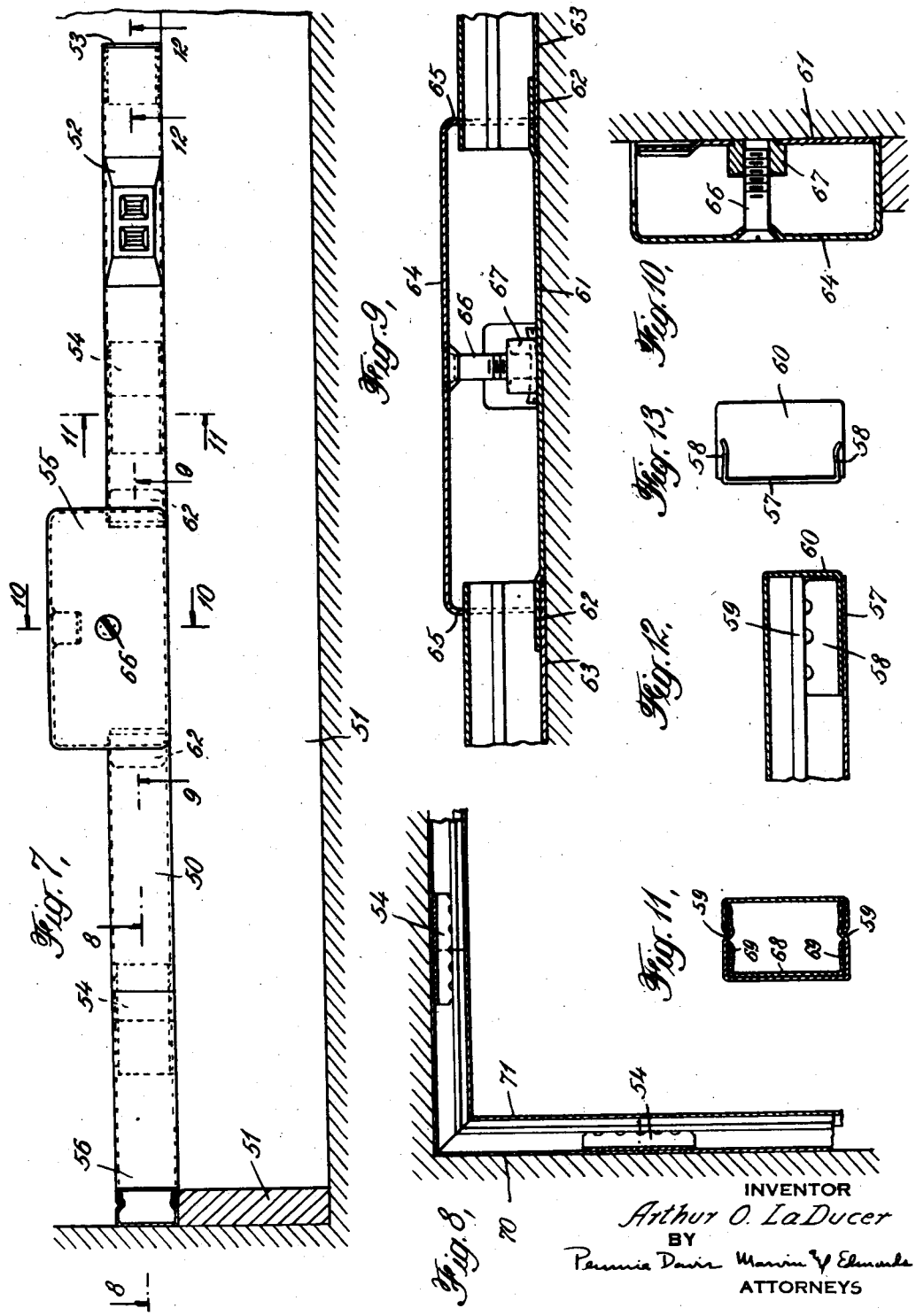
INVENTOR
Arthur O. LaDucer
BY
ATTORNEYS Patented June 10, 1941

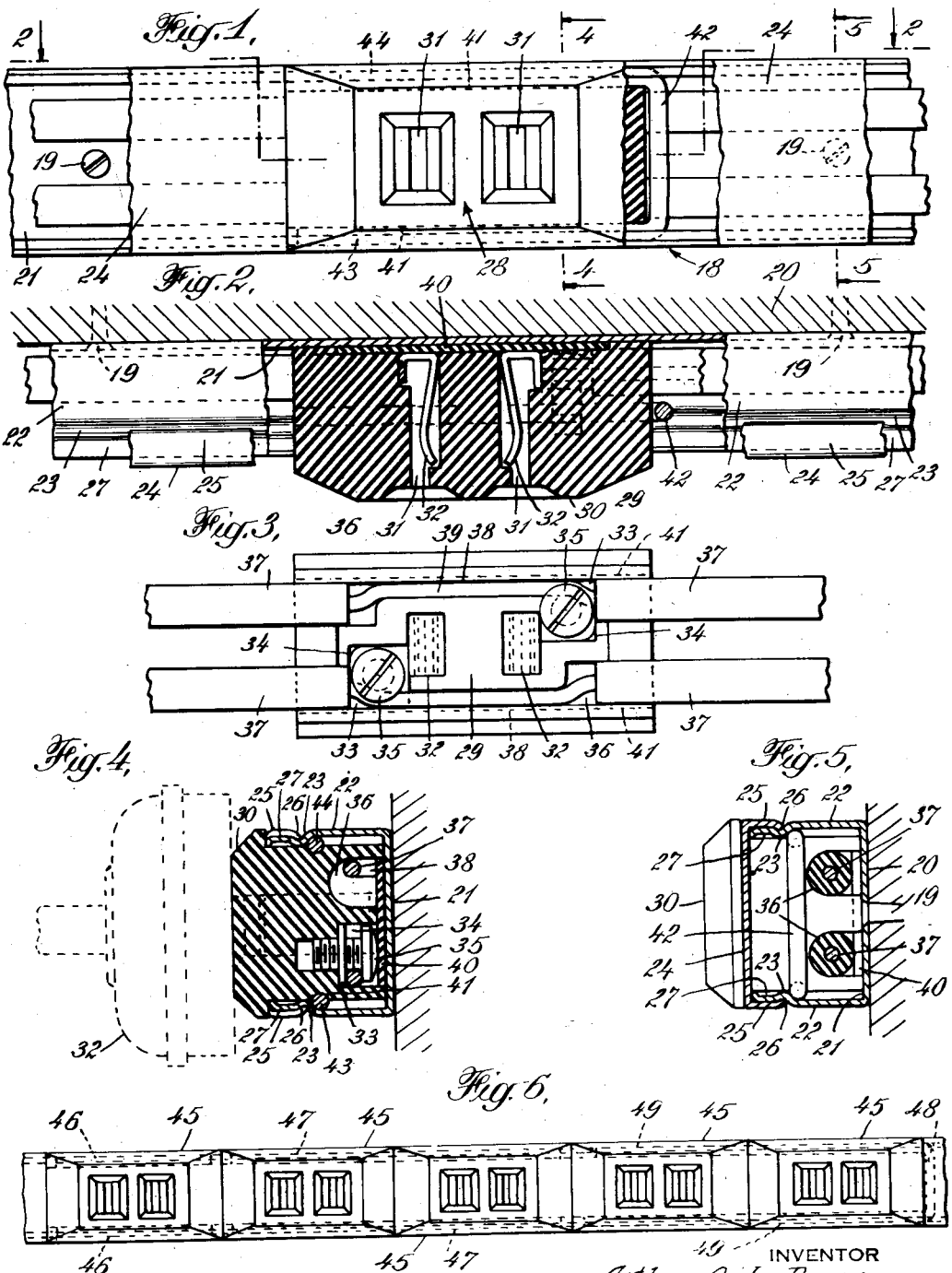

2,244,883

UNITED STATES PATENT OFFICE 2,244,883

WIRING DEVICE

Arthur O. La Ducer, West Hartford, Conn., assignor to The Wiremold Company, a corporation of Connecticut Application September 19, 1939, Serial No. 295,589

10 Claims. (Cl. 173—334.1)

This invention relates to wiring devices, and has for its principal object the provision of an improved electrical wiring assembly of the type adapted to be installed exposed to view, comprising a conduit having electrical outlet fittings mounted and locked therein, which is compact, easy to install, and neat in appearance. The invention also provides an improved electrical outlet fitting especially adaptable for use in unconcealed wiring conduits.

The wiring assembly of the invention comprises a wire receiving conduit, preferably in the form of a channel, having a bottom and side walls, and an electrical outlet fitting, comprising a body member having at least a portion thereof of a width approximately equal to the inner width of the conduit, mounted in the conduit. The conduit side walls and the fitting body member each are provided with lips so positioned on these members as to be in substantial registry when the fitting is mounted in the conduit. Novel means for locking the fitting in the conduit comprises a pin engaging the lips formed on both the fitting body member and the conduit side walls in a manner to prevent withdrawal of the fitting from a conduit.

The invention will be better understood from the following description, considered in conjunction with the accompanying drawings showing a preferred form of conduit and outlet fitting, in which Fig. 1 is a plan of a short section of a conduit with outlet fitting mounted therein;

Fig. 2 is a view, largely in section, taken substantially along the line 2—2 of Fig. 1;

Fig. 3 is a bottom view of the outlet fitting, showing the manner in which wires are connected and are passed therethrough;

Fig. 4 is a cross-section of the assembly taken substantially along the line 4—4 of Fig. 1;

Fig. 5 is a cross-section of the assembly taken substantially along the line 5—5 of Fig. 1;

Fig. 6 is a plan of a short section of conduit having a plurality of outlet fittings mounted therein in closely spaced relation, showing modified forms of locking pins for holding closely spaced fittings in the conduit;

Fig. 7 is a view of a wiring assembly installation embodying the invention, such as might be mounted over a base board;

Fig. 8 is a cross-section taken substantially along the line 8—8 of Fig. 7, showing a right angle elbow adapted to be used in the new wiring assembly;

Fig. 9 is a cross-section taken substantially along the line 9—9 of Fig. 7, showing a junction box adapted for use in conjunction with the new wiring assembly;

Fig. 10 is a cross-section of the junction box taken substantially along the line 10—10 of Fig. 7;

Fig. 11 is a cross-section taken substantially along the line 11—11 of Fig. 7, showing a connector fitting for adjacent sections of conduit;

Fig. 12 is a cross-section taken substantially along the line 12—12 of Fig. 7, showing an end closure fitting adapted for use in conjunction with the new assembly;

Fig. 13 is an end view of the fitting shown in Fig. 12;

Figure 14:
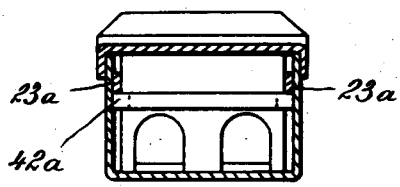
Fig. 14 is a cross section through a channel showing a modified form of construction of the new fitting and assembly.

The wiring assembly shown in Figs. 1 to 6 comprises a wire receiving channel 18, which may be fastened by means of screws 19 to a wall or other surface 20. The wire receiving channel 18, which preferably is rolled from sheet metal, is formed with a bottom wall 21 and side walls 22 extending outwardly substantially at right angles therefrom. The side walls 22 of the channel are bent inwardly in a manner to provide inwardly extending longitudinal projections 23 spaced above the channel bottom.

A cover member 24 rolled from sheet metal with flanges 25 adapted to grip the upper edge portions of the channel side walls is provided for closing the channel. The free edges 26 of the cover flanges 25 advantageously are turned inwardly to an extent sufficient to grip in the depressions formed in the outer surface of the channel side walls by the formation therein of the inwardly extending projections 23. In this manner the cover member is enabled to grip the channel securely. Advantageously also the upper edge portions 27 of the channel side walls above the inwardly extending projections 23 are displaced inwardly by the thickness of the metal of the cover so that the outer surface of the cover flanges 25 will lie substantially flush with the outer surface of the channel side walls 22.

The cover member 24 is interrupted at suitable intervals so that one or more outlet fittings 28 may be mounted in the channel. The fitting 28 comprises a body member 29 of molded plastic or other electrical insulating material, the main portion of which is of a width approximately equal to the inner width of the channel between the inwardly extending projections 23 in the side walls thereof. The outermost portion 30 of the fitting body member preferably is equal in width to the maximum outer width of the channel cover 24 and is suitably configured so as to present a neat appearance in conjunction with the channel cover.

Slots 31 for receiving the prongs of a standard plug 32 are formed in the fitting body member 29. The slots 31 preferably run transversely of the fitting and are spaced apart longitudinally thereof, as shown in the drawings, because the fitting and channel may be made so compact as to provide insufficient width for receiving the plug prongs in the usual manner (at right angles to the position shown in the drawings) and still leave room for wire connections and adequate insulation.

Clips 32 are mounted in the slots 31 for making electrical contact with the prongs of a plug. The clips 32 are suitably bent at right angles to form connector lugs 33 received in recesses 34 formed in the fitting body member 29. The connector lugs 33 are drilled and tapped to receive screws 35 for making electrical connection to wires.

Wire receiving recesses 36 are formed in each end of the fitting body member and are sufficiently large to receive connecting wires 37 with insulation thereon. Relatively narrow slots 38 run longitudinally of the body member between the wire receiving recesses 36 at either end thereof. These slots are adapted to receive the bare wires 39 to which the fitting is connected, thus permitting the wires to be passed through the fitting. The slots 38 preferably are of only sufficient width to receive the wires 39 from which the insulation has been removed, so as to eliminate the bulk that would be required of the fitting to permit passage therethrough of connecting wires with insulation thereon. For example, No. 12 or 14 B. & S. gauge wire, such as is commonly used for household wiring circuits, is, bare, of the order of one-sixteenth of an inch in diameter, but such wire covered with the standard thickness of rubber and impregnated fabric insulation (i. e., ordinary building wire) is of the order of one-fourth of an inch in diameter. In the case of fittings designed for use with two such wires, therefore, the provision of narrow slots 38 in accordance with the invention permits a saving of about three-eighths of an inch in the width of the fitting body member. Although the wires 39 in the slots 38 are bare, the relatively heavy insulation provided by the surrounding walls of the fitting body member adequately protects them. The bare wires 39 running through the slots 38 pass over the connector lugs 33, and are firmly connected thereto by means of the screws 35. A bottom closure 40 of fiber or like insulating material is fitted to the bottom of the fitting body member and is there held in place by suitable flanges with which the body member is provided. The bottom member 40 cooperates with the fitting body member completely to enclose the metallic parts of the fitting and the connecting wires and insulate them adequately from each other and from the metallic channel.

An important feature of the invention is the novel means employed to lock the fitting in the channel. The fitting body member 29 is formed with longitudinal grooves 41 which are so positioned as to register substantially with the inwardly extending projections 23 of the channel side walls 22 when the fitting is mounted in the channel. A locking pin 42, preferably of metallic wire or rod substantially greater in thickness than the depth of the groove 41, is removably seated in this groove and projects beyond the outer surface of the body member to bear against the under side of the inwardly extending projections 23 of the channel side walls in a manner to prevent withdrawal of the fitting from the channel. The side edges of the groove 41 serve as lips which prevent displacement of the locking pin 42 toward the top or bottom of the fitting body member, and the under side of the inwardly extending projections 23 (that is, the side toward the bottom 21 of the channel) serves as a lip preventing the fitting with locking pin in place from being withdrawn from the channel. The side walls 22 of the channel prevent the locking pin 42 from being displaced laterally from the grooves in which it is seated in the body member.

The locking pin 42 advantageously is U-shaped with its legs spaced apart just sufficiently to fit without appreciable distortion into the grooves 41 on opposite sides of the body member 29, and embrace between them that portion of the fitting body member lying between the bottoms of these grooves. If a U-shaped locking pin is employed, one leg 43 thereof advantageously is longer than the other leg 44, so as to facilitate insertion of the pin after positioning the fitting in the channel. Such a pin is readily inserted in place by inserting the end of the longer leg 43 into one of the grooves 41, and sliding the pin, which is then guided by the longer leg, longitudinally until the shorter leg 44 enters the groove on the opposite side. The pin is then slid home over the fitting to lock the fitting securely in place in the channel.

It is sometimes desirable to mount outlet fittings in end-to-end abutting relation, and this cannot be done with more than two fittings if a separate U-shaped pin as described above is employed for each fitting. By using two straight pins, however, or a U-shaped pin having legs of sufficient length, it is possible to mount the fittings in end-to-end contact with each other and lock long rows of them in the channel just as effectively as a single fitting is locked in place by the U-shaped pin described above. This arrangement of many outlet fittings abutting end-to-end is particularly convenient for use in testing electric appliances, such, for example, as testing electric clocks in a clock factory.

Fig. 6 shows five outlet fittings 45 locked in place in end-to-end contact by means of different forms of locking pins. The fitting at the extreme left is locked in place by a pair of straight pins 46 each about the same length as the fitting itself. The next two fittings are held in place by a pair of straight pins 47, each of which is substantially equal in length to the combined length of the pair of fittings which they lock in place. The two fittings at the right are held in place by a U-shaped locking pin 48 having legs 49 which are each substantially as great in length as the combined length of the fittings which they engage. Although the straight pins 47 and the U-shaped pin 48 appearing in Fig. 6 are each shown as locking only two outlet fittings in place, it is apparent that pins of sufficient length may be employed to lock any number of fittings in the channel in end-to-end abutment.

The locking pins described above do not prevent the outlet fittings from sliding longitudinally of the channel, but the cover member 24 on each side thereof and abutting the fitting ends does prevent such longitudinal movement, and so the fitting is firmly held in place in the channel.

Figure 15:
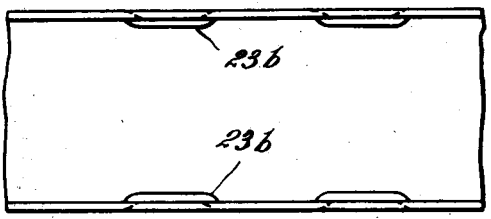
Fig. 15 is a plan view of a channel of modified construction for use in accordance with the invention.
Figure 17:
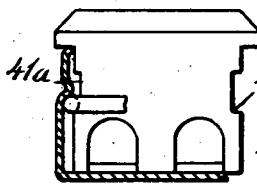
Fig. 17 is a fragmentary cross section through a channel in which is mounted a modified form of fitting.
Figure 18:
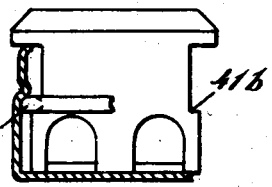
Fig. 18 is a fragmentary cross section through a channel in which is mounted yet another modified form of fitting.
Figure 16:
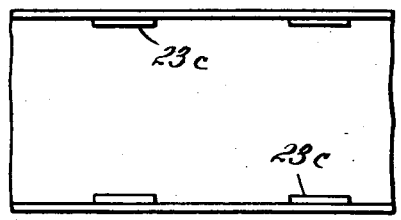
Fig. 16 is a plan view of a channel of yet another modified form.
Figure 19:
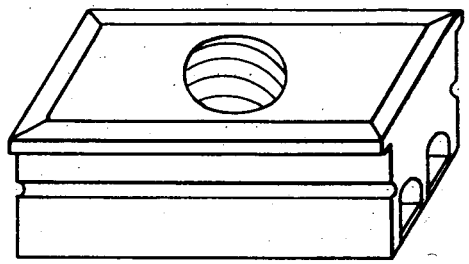
Fig. 19 is a perspective of a socket fitting in accordance with the invention.
Figure 20:
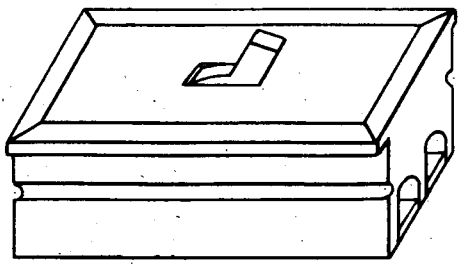
Fig. 20 is a perspective of a switch fitting in accordance with the invention.
Figure 21:
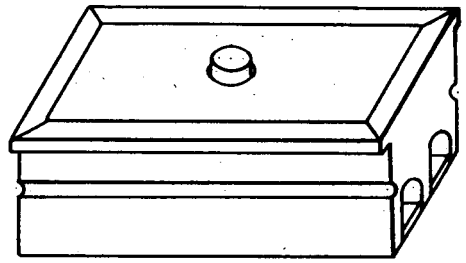
Fig. 21 is a perspective of a push button fitting in accordance with the invention.

The particular construction of outlet fitting, channel, and locking means described above and shown in the drawings is preferred for the reason that it makes possible the construction of a particularly compact and neat assembly, the channel portion of which need not be more than about three-fourths of an inch in width and half an inch in depth to meet safe wiring standards. If desired, however, the construction described and shown may be modified in a number of ways. For example, in place of forming the inwardly extending projections on the channel side walls by bending the side walls inwardly, these walls may be left straight, and narrow strips of metal 23a may be welded or otherwise attached to the inner surfaces of the channel side walls to provide the lips required for engagement with the locking pins, as shown in Fig. 14. In place of inwardly extending projections in the form of continuous longitudinal ribs, these projections may be in the form of short indentations (or short pieces of metal secured to the inner side of the channel walls) spaced apart by short intervals of side walls free of such projections. A plan view of a channel having short inwardly extending projections 23b formed by pressing the side walls of the channel inwardly as shown in Fig. 15, and Fig. 16 shows a plan of a channel having short strips of metal 23c welded or otherwise secured to the channel side walls. The undersurface of the projections 23b (Fig. 15) and 23c (Fig. 16) function in the same manner as the lower surface of the projections 23 (Fig. 5) to engage with the locking pin and hold the fitting in place. The fitting body member, instead of being provided with grooves only wide enough to receive the locking pin 42, may be provided with substantially wider grooves 41a (Fig. 17), or with a shoulder 41b (Fig. 18) instead of a groove, for engaging with the side of the locking pin toward the channel. The locking pin itself may be rectangular or oval, rather than circular, in cross-section. A locking pin 42a of rectangular cross section is shown in Fig. 14 and a locking pin 42b of oval cross section is shown in Fig. 18. The fitting shown in the drawings is in the form of a plug receptacle adapted to receive a standard plug, but of course other outlet fittings, such as sockets (Fig. 19), switches (Fig. 20), push buttons (Fig. 21), and the like, may be similarly constructed and mounted in a suitable channel. Various other possible modifications will also be apparent from a consideration of the drawings and foregoing description.

The positive locking means by which the outlet fitting is held in place in the channel renders the new wiring assembly safe to use and to work upon. It is much safer than wiring assemblies of the same general type in which an electrical fitting is held in place in the channel by means of the channel cover. Channel covers sometimes become accidentally detached from the channel, and this is particularly liable to occur if the cover serves to hold an outlet fitting in place and is subjected, for example, to the strain imposed when a plug is pulled or jerked from a plug receptacle. Moreover, when the cover is removed for the purpose of making repairs or installing additional fittings, the positive locking means of the new wiring assembly prevents the fitting from dropping or being accidentally knocked from its position in the channel.

A further advantage of the assembly described resides in the ease with which it may be wired. A wireman at his bench may connect fittings to the wires at any predetermined intervals, and the resulting string of fittings may be slipped into the channel and fastened securely in place by means of the locking pins. Whether the channel is loose on the wireman's bench or it is permanently installed in the building, this operation is easily performed.

A further advantage of the wiring assembly of the invention is that additional fittings may easily be installed at any time. In order to insert one or more additional fittings into an installation already made, it is necessary only to remove the cover, exposing the wires, and if there is sufficient slack to withdraw the wires a very short distance from the channel, the insulation is removed over a short length of the wires, the additional fitting is connected and then mounted and locked in the channel, and the cover is replaced after cutting from it a section equal in length to the length of the additional fitting or fittings installed.

The wiring assembly shown and described above is such that a complete line of the usual channel fittings may easily be provided. In Fig. 7, for example, there is shown a channel 50 with various channel fittings mounted over a baseboard 51. The channel is provided with an outlet fitting 52 such as that described above and with channel fittings comprising an end fitting 53, a channel connecting fitting 54, a junction box 55 and an elbow 56.

The end fitting 53 (Figs. 12 and 13) comprises a base member 57 for bearing against the bottom wall of the channel and having up-turned side flanges 58 for bearing against the side walls of the channel. The channel side walls are provided with inwardly extending projections 59, as described above, and the extremities of the flanges 58 of the end fitting are bent outwardly to engage the under side of these projections in order to hold the fitting in place. An up-turned end closure member 60 is secured to the end fitting bottom 57 and is sufficiently wide and high to abut against the ends of the channel and channel cover to close the channel end.

The junction box 55 (Figs. 9 and 10) comprises a base plate 61 which may be screwed or otherwise affixed to the wall or other surface on which it is mounted. The base plate is provided with lips 62 displaced upwardly by the thickness of the metal of the channel and located at points where a channel is intended to enter the box. These lips 62 are adapted to underlie and hold the channel bottom 63 in place. A junction box cover 64 having down-turned side walls 65 is mounted in place by a screw 66 engaging a nut 67 affixed to the junction box base plate 61. The down-turned side walls of the junction box cover is provided with apertures large enough to receive the channel and cover where it enters the junction box.

The channel connecting fitting 54 (Fig. 11) comprises a bottom member 68 having up-turned side flanges 69. The extremities of the side flanges 69 are turned outwardly and are adapted to engage with the under side of the longitudinal inwardly extending projections 59 formed on the channel side walls. The channel connector fitting is adapted to extend into the end portions of abutting sections of channel to hold them in proper alignment.

The elbow 56 (Fig. 8) comprises essentially a section of channel 70 which has been mitered to permit it to be bent at right angles. It is closed by means of a cover 71 which has been similarly bent and made of proper length to close the elbow without overlapping adjacent sections of channel. The elbow advantageously is held in alignment with the channel to which it is connected by means of a channel connector fitting 54.

The foregoing brief description of channel fittings adapted to be used in conjunction with the wiring assembly of the invention is illustrative only of the adaptability of the invention to installations in a wide variety of locations, and is not in any way exhaustive of the possible types and combinations of fittings that may be employed.

The wiring assembly of the invention is particularly well adapted for use where space limitations or other considerations preclude or render undesirable the use of bulkier types of wiring assemblies such as heretofore have been available. The new wire assembly and outlet fitting may be made extremely compact and presents an unusually neat appearance which renders it particularly suitable for use where exposed wiring conduit for fittings are necessary or desired.

I claim:

1. An electrical wiring assembly comprising a wire-receiving conduit having a bottom wall and side walls extending upwardly therefrom, an electrical outlet fitting comprising a rectangular body member mounted in the conduit, said conduit side walls and the said sides of fitting body member each being provided with longitudinally extending lips positioned so as to be in substantial registry when the fitting is mounted in the conduit, and means for locking the fitting in the conduit comprising a longitudinally extending pin engaging the lips of both the fitting body member and the conduit side walls in a manner to prevent withdrawal of the fitting from the conduit.

2. An electrical wiring assembly comprising a wire-receiving channel having a bottom wall and side walls extending upwardly therefrom, said channel side walls being provided with inwardly extending projections positioned above the channel bottom wall, an electrical outlet fitting comprising a rectangular body member having at least a portion thereof of a width approximately equal to the inner width of said channel between said projections mounted in the channel, said fitting body member being provided with longitudinal recesses positioned so as to register substantially with the projections in the channel side walls when the fitting is mounted in the channel, and means for locking the fitting in the channel comprising a pin received in said recesses and engaging the under sides of said projections in a manner to prevent withdrawal of the fitting from the channel.

3. An electrical wiring assembly comprising a wire-receiving channel having a bottom wall and side walls extending upwardly therefrom, said channel side walls being formed with longitudinal inwardly extending ribs positioned above the channel bottom wall, an electrical outlet fitting comprising a body member of a width approximately equal to the inner width of the channel between said ribs mounted in said channel, said fitting body member being provided with longitudinal grooves formed in the sides thereof and positioned so as to register substantally with the ribs when the fitting is mounted in the channel, and means for locking the fitting in the channel comprising a pin received in said grooves and engaging with the under sides of said ribs in a manner to prevent withdrawal of the fitting from the channel.

4. An electrical wiring assembly comprising a wire-receiving channel having a bottom wall and side walls extending upwardly therefrom, each of said channel side walls being formed with a longitudinal inwardly extending rib positioned above the channel bottom wall, an electrical outlet fitting comprising a body member of a width approximately equal to the inner width of the channel between said ribs mounted in the channel, said fitting body member being provided with a longitudinal groove formed in each side thereof and positioned so as to register substantially with the ribs on the channel side walls when the fitting is mounted in the channel, and means for locking the fitting in the channel comprising a U-shaped pin having its legs substantially greater in thickness than the depth of the grooves formed in the fitting sides and having said legs spaced apart just sufficiently to fit into said grooves in opposite sides of the fitting body without substantial distortion of the pin, said pin engaging with the under sides of the ribs on the channel side walls in a manner to prevent withdrawal of the fitting from the channel.

5. An electrical fitting adapted to be received and locked in a channel having side walls provided with inwardly extending projections spaced above the bottom wall, comprising a rectangular fitting body member having at least a portion thereof of a width approximately equal to the inner width between the side wall projections of the channel in which the fitting is adapted to be received, the sides of said body member being provided with lips so positioned as to register substantially with the side wall projections of the channel when the fitting is mounted therein, and a locking member in the form of a pin designed to engage with said lips and being adapted also to engage with the side wall projections of the channel to lock the fitting in the channel when the fitting is mounted therein.

6. An electrical fitting adapted to be received and locked in a channel having side walls provided with inwardly extending projections spaced above the bottom wall, comprising a rectangular fitting body member of a width approximately equal to the inner width between the side wall projections of the channel in which the fitting is adapted to be received, the sides of said fitting being formed with longitudinal grooves so positioned as to register substantially with the side wall projections of the channel when the fitting is mounted therein, and a locking member in the form of a pin of greater thickness than the depth of the grooves formed in the sides of the fitting but adapted to be removably received in at least one of said grooves, whereby, after positioning said fitting body member in the channel, the pin may be inserted into at least one of said grooves beneath an adjacent channel side wall projection in a manner to lock the fitting in the channel.

7. An electrical fitting adapted to be received and locked in a channel having side walls provided with inwardly extending projections spaced above the bottom wall, comprising a fitting body member of a width approximately equal to the inner width between the side wall projections of the channel in which the fitting is adapted to be received, the sides of said fitting being formed with longitudinal grooves so positioned as to register substantially with the side wall projections of the channel when the fitting is mounted therein, and a locking member in the form of a removable U-shaped pin having legs substantially greater in thickness than the depth of the grooves formed in the fitting sides and having said legs spaced apart just sufficiently to embrace between them without substantial distortion of the pin that portion of the fitting body between the bottoms of said grooves, one of the legs of said pin being longer than the other, whereby, after positioning said fitting body member in the channel, the pin may be conveniently inserted into said grooves beneath the channel side wall projections in a manner to lock the fitting in the channel.

8. An electrical fitting adapted to be received and locked in a channel having side walls provided with inwardly extending projections spaced above the bottom wall, comprising a rectangular fitting body member having electric current carrying elements disposed therein and having at least a portion thereof of a width approximately equal to the inner width between the side wall projections of the channel in which the fitting is adapted to be received, the sides of said body member being provided with lips so positioned as to register substantially with the side wall projections of the channel when the fitting is mounted therein, said lips being adapted to engage with a locking member in the form of a pin capable of simultaneously engaging with the side wall projections of the channel, the fitting thereby being adapted to be locked in the channel by the pin after the fitting has been mounted in the channel, said fitting member being provided with a face portion substantially wider than the fitting body member and adapted to cover the open top of the channel.

9. An electrical fitting of the character described comprising a rectangular body member adapted to be received and locked in a channel having side walls provided with inwardly extending projections spaced above the bottom wall of the channel, the outer sides of said body member being provided with longitudinally extending grooves so positioned as to register substantially with the side wall projections of the channel when the fitting is mounted therein, and a substantially U-shaped locking pin having straight shank portions of greater thickness than the depth of said grooves adapted to be removably received in said grooves and to lie flat therein and to engage the projections of the channel side walls for locking said fitting in the channel.

10. An electrical wiring assembly comprising a wire-receiving channel having side walls provided with inwardly extending projections spaced above the bottom wall, and an electrical fitting adapted to be received and locked in the channel and comprising a rectangular fitting body member having at least a portion thereof of a width approximately equal to the inner width between the side wall projections of the channel, the sides of said body member being provided with lips so positioned as to register substantially with the side wall projections of the channel when the fitting is mounted therein, said lips being adapted to engage with a locking member in the form of a pin capable of simultaneously engaging with the side wall projections of the channel, the fitting thereby being adapted to be locked in the channel by the pin after the fitting has been mounted in the channel.

ARTHUR O. LA DUCER.